(12) United States Patent
Burton, Jr.

(10) Patent No.: US 9,301,108 B2
(45) Date of Patent: Mar. 29, 2016

(54) AUDIO CONTENT DISTRIBUTION CONTROL SYSTEM AND METHOD

(71) Applicant: Clayton B. Burton, Jr., Clearwater, FL (US)

(72) Inventor: Clayton B. Burton, Jr., Clearwater, FL (US)

( * ) Notice: Subject to any disclaimer, the term of this patent is extended or adjusted under 35 U.S.C. 154(b) by 23 days.

(21) Appl. No.: 13/959,389

(22) Filed: Aug. 5, 2013

(65) Prior Publication Data

US 2013/0331066 A1 Dec. 12, 2013

Related U.S. Application Data

(63) Continuation-in-part of application No. 13/100,233, filed on May 3, 2011, now Pat. No. 8,503,986, which is a continuation-in-part of application No. 10/795,125, filed on Mar. 5, 2004, now Pat. No. 7,937,098.

(51) Int. Cl.
*H04W 4/12* (2009.01)
*G06Q 30/02* (2012.01)
*H04M 3/428* (2006.01)

(52) U.S. Cl.
CPC .................. *H04W 4/12* (2013.01); *G06Q 30/02* (2013.01); *H04M 3/4285* (2013.01)

(58) Field of Classification Search
CPC ....... H04M 3/428; H04M 3/563; H04M 3/38; H04M 3/56; H04M 15/62; H04M 15/68; H04M 15/745; H04M 2215/0108; H04M 2215/0196; G06Q 30/00; G06Q 10/087; G06Q 20/085; G06Q 20/16; G06Q 20/382; G06Q 30/0207; G06Q 30/0267; G06Q 30/02; H04W 4/12
USPC ......................................................... 455/412
See application file for complete search history.

(56) References Cited

U.S. PATENT DOCUMENTS

| | | | |
|---|---|---|---|
| 2005/0190899 A1* | 9/2005 | Rhodes, Jr. ............... | 379/101.01 |
| 2014/0219426 A1* | 8/2014 | Hazenfield ................ | 379/68 |
| 2015/0095440 A1* | 4/2015 | Vendrow et al. .......... | 709/206 |

\* cited by examiner

*Primary Examiner* — Diane Mizrahi
(74) *Attorney, Agent, or Firm* — Johnson & Martin, P.A.; James David Johnson

(57) ABSTRACT

A system for providing access to audio files at multiple locations via a telecommunications network is described. The system includes an interface by which an end user can access at least one audio file from an online database; a system for selecting at least one audio file from the online database for inclusion in a playlist; a plurality of playback devices located in multiple locations; and a system for transmitting the at least one audio file for playing on the plurality of playback devices in multiple locations. Messages may be locked into playlists by an administrator using a message locking tool. Settings may be duplicated among devices using a cloning tool.

20 Claims, 15 Drawing Sheets

HOLD DIRECT | ACCOUNT SETTINGS | SUPPORT | AMTC

PLEASE SELECT THE MESSAGE FILE YOU WISH TO DOWNLOAD BY CLICKING ON THE FILE WITH YOUR MOUSE. TO SELECT MULTIPLE FILES, HOLD DOWN THE CTRL KEY AND CLICK ON EACH FILE. TO READ THE TEXT OF A FILE, POINT TO THE FILE AND DOUBLE CLICK. WHEN YOU'VE SELECTED ALL THE FILES YOU WANT TO DOWNLOAD. CLICK "DOWNLOAD".

AVAILABLE STANDARD MESSAGES:

INTRODUCTION
SERVICE1
CHOOSING A MOVING COMPANY
COST GUARANTEE
COMPREHENSIVE PROTECTION
TIME GUARANTEE
STEP-BY-STEP MOVING
BEKINS DRIVERS
BEKINS HISTORY           258
INNOVATION
HELPING YOU MOVE
BECOMING INVOLVED
PLANNING AN ORGANIZATION
COMPILING PERSONAL RECORDS
DO YOU REALLY NEED IT?
THINGS YOU SIMPLY CANNOT MOVE
DATES AND SCHEDULES
COMMUNICATION IS KEY
SUMMER MOVES
TELLING THE WORLD
MOVING PICTURE BOOK
COST OF LIVING REPORTS
HOME MARKETING ASSISTANCE

AVAILABLE CUSTOM MESSAGES:

DIRECTIONS TO OUR OFFICE
IN BUSINESS SINCE 1964
SERVING THE COMMUNITY
HAPPY HOLIDAYS

262

260
CUMULATIVE SIZE OF SELECTED FILES: [ ] MB  [DOWNLOAD]

FIG. 8

AUDIO CONTENT DISTRIBUTION CONTROL SYSTEM AND METHOD

CROSS-REFERENCE TO RELATED APPLICATION

This application is a continuation-in-part of and claims priority from U.S. patent application Ser. No. 13/100,233 filed on May 3, 2011, which is a continuation-in-part patent application of U.S. nonprovisional patent application Ser. No. 10/795,125 filed on Mar. 5, 2004 (now U.S. Pat. No. 7,937,098), each of which are incorporated in their entirety herein by reference.

FIELD OF THE INVENTION

The present invention is directed to systems and methods for distributing audio content to remote locations. In particular, the present invention is directed to systems and methods for permitting end users to remotely select audio content to be distributed to a remote location and to control the features related to that audio content distribution.

BACKGROUND

One of the fastest growing areas of business is the use of on-hold messaging systems to provide general business and marketing information and the like. The simplest on-hold system plays background music while the end user is on hold. More recently, companies have begun to combine music with voiceovers. The inclusion of voiceovers permits businesses to incorporate news about the business and new products or services. Today, on hold systems provide valuable information to potential and existing customers.

A system exists for providing a single on-hold audio message to a plurality of business telephone systems at separated geographic locations converts the audio message into digital form, compresses the resulting digital file, and transmits the file via the Internet as an attachment to an e-mail message to general purpose computers located in association with each of the business telephone systems. Each of the general purpose computers receiving the message writes it onto a floppy disc which is provided to an associated playback unit. The playback units read the compressed digital files representing the on-hold message, provide the re-circulating flash memories, provide the output of the flash memories to de-compressors and the output of the de-compressors to digital-to-analog converters. The resulting audio signals are applied to the on-hold inputs of each of the business telephone systems.

An on-hold messaging system has also been created for use with a business telephone system having an on-hold audio input. The system includes an optical disc having one or more messages recorded thereon, an optical disc player having an audio output, and a connection or interface between the audio output of the optical disc player and the on-hold input of the business telephone system. The optical disc player is enabled to continuously play the message or messages through the business telephone system, so that at least a portion of a message can be heard by an outside party when a telephone call between the outside party and a user of the business telephone system has been completed and the outside party is placed on hold by a user of the business telephone system. Optionally, an audio amplifier may be used as an interface between the optical disc player and the on-hold input of the business telephone system, so that the sound quality of the message as heard by the outside party is satisfactory.

A point to multipoint messaging system has been developed utilizing the FM 57 kHz Radio Broadcast Data System (RBDS) standard and a novel receiver. A single broadcast source sends messages from multiple senders, in a variety of manners including automatically and semi-automatically, to a plurality of receivers who may select to receive or not to receive particular senders' messages. The receiver is remotely programmable by the user so that the user may select to receive at least some messages Some systems have been created to address problems related to audio conference calls. The music on-hold-problem occurs when a conferee having music-on-hold puts the conference call on hold, resulting in a continuous stream of music being transmitted to the other conferees. Such a conferee is called an offending conferee. The solution presented herein is to prevent music-on-hold signals emanating from an offending conferee from being passed through an audio conference bridge to the other conferees. This is accomplished, in particular embodiments, by directing a merging/summing subsystem of the audio conference bridge to temporarily stop combining audio emanating from the offending conferee from being combined or merged onto audio channels through which the other conferees communicate on the audio conference. Once the music-on-hold is terminated, the offending conferee can rejoin conference call by sending a signal that directs the merging/summing subsystem to resume the combining of audio signals emanating from the offending conferee onto the audio channels of the other conferees.

Another conventional remotely programmable message delivery system features a number of client computers which communicate with a server to send control signals to one or more remote message playback devices. The message playback devices are each provided with a library of messages, and comprise at least one music on-hold-compatible telephone system, a public address system or other audio and/or visual advertising device. Message playlists from the client computers can be sent via the server to the message playback devices by a communication link such as a radio paging system. The client computer is programmed to generate screens for guiding an operator to select messages from the library of messages and the order and times at which they are to be played by selected message playback devices. Message playback devices can be organized into one or more regions to allow a message playlist to be sent to more than one message playback device using a single radiopaging signal.

Most of the conventional message delivery systems are characterized by basic, simple systems in which on-hold messages are provided by mail as tapes or physical media. The previous efforts at online systems have required that special software be resident on the customer's computer. This has made it both difficult and expensive to change and alter on-hold messages.

A need exists for a system whereby the on-hold messages can be easily authored, selected and downloaded. A need also exists for a system by which on-hold messages can be easily downloaded onto an MP3 flash card format. Another need exists for an online system by which end users can easily access, upload, author and download on hold messages and by which end user customers can easily access and download on-hold messages.

A need exists for the ability to remotely control adjustable settings of playback devices. A need also exists for a playback device that can remotely connect to a server to obtain settings and content.

A need exists for the ability to lock one or more message into a play list. A need also exists to easily clone settings between devices and playlists.

These and other objects of the present invention will become apparent from the detailed description which follows.

SUMMARY OF THE INVENTION

An audio content distribution control system for providing access to audio files at multiple locations via a telecommunications network is described. The system can include an interface by which an end user can access at least one audio file from an online database and a system for selecting at least one audio file from the online database for inclusion in a playlist. The system can further include a plurality of playback devices located in multiple locations. The system can also feature means for transmitting the at least one audio file for playing on the plurality of playback devices in multiple locations. The system can be used to remotely control the adjustable settings of the playback device and to download settings modifications and newly selected audio content to the playback device from a remotely located server.

The audio content distribution control system provides an advantage over conventional audio content distribution systems in that it can be used to assign permission for audio content selection to multiple users located in multiple remote locations for distribution and playing in the same or different remote locations.

The audio content distribution control system provides an additional advantage in that it permits the administrator to play audio advertisements or informational messages related to the administrator's goods, services, and promotions on playback devices installed in multiple locations, but also permits the administrator to allow secondary users access to unassigned slots in the administrator's playlist so that the secondary users can select or upload each secondary user's own user-selected audio files related to advertising, informational messages, or other local topics relevant to the secondary user's location such as, for example, store hours, location, local sales, and manager's specials. These capabilities are particularly useful for franchisor-franchisee and manufacturer-dealer or supplier-dealer business relationships where the franchisor, manufacturer, or supplier is in a location that is remote from the location of the franchisee or dealer.

Still another advantage of the audio content distribution control system is that an administrator who is a retail store owner may generate revenue by selling advertising "slots" in the administrator's playlist to the retail store owner's vendors that provide products in the store, thereby allowing the vendors to advertise and promote their products in the store. The system allows the administrator to prevent each advertiser from modifying the advertisements or other audio content of any other advertiser while retaining full editing privileges for the administrator. Advertisers can use these features of the system to provide store-specific advertising content such as promotions for gift cards, gift registries, rewards programs, and the like.

Additionally, another advantage of the audio content distribution control system is that it advantageously provides an ability to lock one or more message into a play list. Furthermore, the audio contribution control system of the present invention allows settings to be easily cloned between various devices and/or playlists.

Accordingly, the invention may feature a system for online access to an on-hold message. The system may include an interface and a downloading tool. The interface may allow an end user to access the message from a database connected via a network. The interface may include a cloning tool and a message locking tool. The cloning tool may be used to substantially duplicate settings by reading the settings from a source device and writing the settings to a target device. The message locking tool may be used to define the message required to be included in a playlist. The downloading tool may be used for downloading the message as a file to be played by a phone system to the end user.

In another aspect, the message locking tool is manipulable by an administrator to lock the message in the playlist Additionally, the message locking tool is restricted from being manipulated by a secondary user.

In another aspect, the message to be locked is selectable by the administrator as required for inclusion in the playlist that is otherwise customizable by the secondary user.

In another aspect, the playlist is associable with a device, a company, or the device and the company.

In another aspect, the system may further include software having the interface and software application features that permit multiple users to access and control selection and distribution of the file. The system may also include a computer having a display device on which the interface is viewable. Additionally, the system may include a server communicatively connected to the database. The files may be included by the database. The software is installable on the server. The server and the computer are communicatively connectable via the network.

In another aspect, the phone system is communicatively connected to the server.

In another aspect, a conflict between the message locking tool and the cloning tool is resolved in favor of the message locking tool.

In another aspect, the target device is includable in a list of target devices that is sortable.

According to an embodiment of the present invention, a system is provided for online access to an on-hold message that includes an interface and a downloading tool. The interface may allow an end user to access the message from a database connected via a network. The interface may include a cloning tool and a message locking tool. The cloning tool may be used to substantially duplicate settings. The message locking tool may be used to define the message required to be included in a playlist. The message locking tool may also be manipulable by an administrator to lock the message in the playlist and being restricted from being manipulated by a secondary user. The downloading tool may be used to for downloading the message as a file to be played by a phone system to the end user. The message to be locked is selectable by the administrator to be required for inclusion in the playlist that is otherwise customizable by the secondary user.

In another aspect, the playlist is associable with a device, a company, or the device and the company.

In another aspect, the system may further include software having the interface and software application features that permit multiple users to access and control selection and distribution of the file. The system may also include a computer with a display device on which the interface is viewable. Additionally, the system may include a server communicably connected to the database. One or more file may be included by the database. The software is installable on the server. The server and the computer are communicatively connectable via the network. The phone system is also communicatively connected to the server.

In another aspect, to substantially duplicate the settings, the cloning tool may read the settings from a source device and write the settings to a target device includable in a list of target devices.

In another aspect, the list of target devices is sortable.

In another aspect, a conflict between the message locking tool and the cloning tool is resolved in favor of the message locking tool.

According to an embodiment of the present invention, a method aspect is provided for accessing and configuring an on-hold message. The method aspect may include (a) accessing an interface to define the message selected from a database connected via a network to be heard by an end user. The method aspect may also include (b) operating a message locking tool accessible via the interface to define the message required to be included in a playlist. Additionally, the method aspect may include (c) operating a cloning tool accessible via the interface to substantially duplicate settings. Furthermore, the method aspect may include (d) downloading the message as a file to be played by a phone system. A conflict between the message locking tool and the cloning tool is resolved in favor of the message locking tool.

In another aspect of the method, step (b) may further include (i) providing access for an administrator to lock the message in the playlist and (ii) restricting the access for a secondary user from manipulating the message that is locked in the playlist.

In another aspect of the method, step (b) further may further include, before operation (ii), (iii) selecting the message to be locked by the administrator to be required for inclusion in the playlist that is otherwise customizable by the secondary user.

In another aspect of the method, before step (a), the method may include additional steps. More specifically, the method may include (e) providing the database to include a master audio content database comprising the file that is selectable for inclusion in the playlist.

The method may also include (f) registering an administrator account to be controlled by the administrator. The method may include (g) authorizing the administrator of define the message to be locked. Additionally, the method may include (h) registering a secondary user account to be accessed and modified by the secondary user. The method may include (i) allowing the secondary user to customize the playlist without affecting a status of the message that is locked.

In another aspect of the method, the method may further include (j) associating the playlist with a device, a company, or the device and the company.

In another aspect of the method, step (c) may further include (i) reading the settings of a source device using the cloning tool and (ii) writing the settings to a target device using the cloning tool. The target device is includable in a list of target devices.

In another aspect of the method, the list of target devices is sortable.

In an embodiment of the present invention, a system is discussed for providing online access to on-hold messages. The system may include an interface by which an end user can access at least one on-hold message from an online database. A system for downloading at least one message as a file to be played on an end user phone system may also be included in this embodiment.

In an embodiment of the present invention, a method is provided for distributing audio files selected by multiple users to multiple locations. The method may include (a) providing a master audio content database comprising audio files that are selectable for inclusion in one or more unassigned slots of a playlist stored in a customer database. The method may also include (b) registering an administrator account to be controlled by an administrator. Additionally, the method may include (c) creating at least one secondary user account to be accessed and modified by the at least one secondary user. The method may include (d) allowing the at least one secondary user to access the master audio content database and select one or more audio files for inclusion in one or more the unassigned slots of the playlist. Furthermore, the method may include (e) electronically transmitting the playlist to at least one playback device for playing in at least one location.

In another aspect of the method, step (d) of the method further include assigning each of the one or more unassigned slots of the playlist to one of the at least one secondary users to allow the assigned secondary user to insert advertisements for playing in the assigned secondary user's assigned slot in the playlist.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIGS. 4 to 8 illustrate computer interface for use in the present invention.

DETAILED DESCRIPTION

Figure 1:
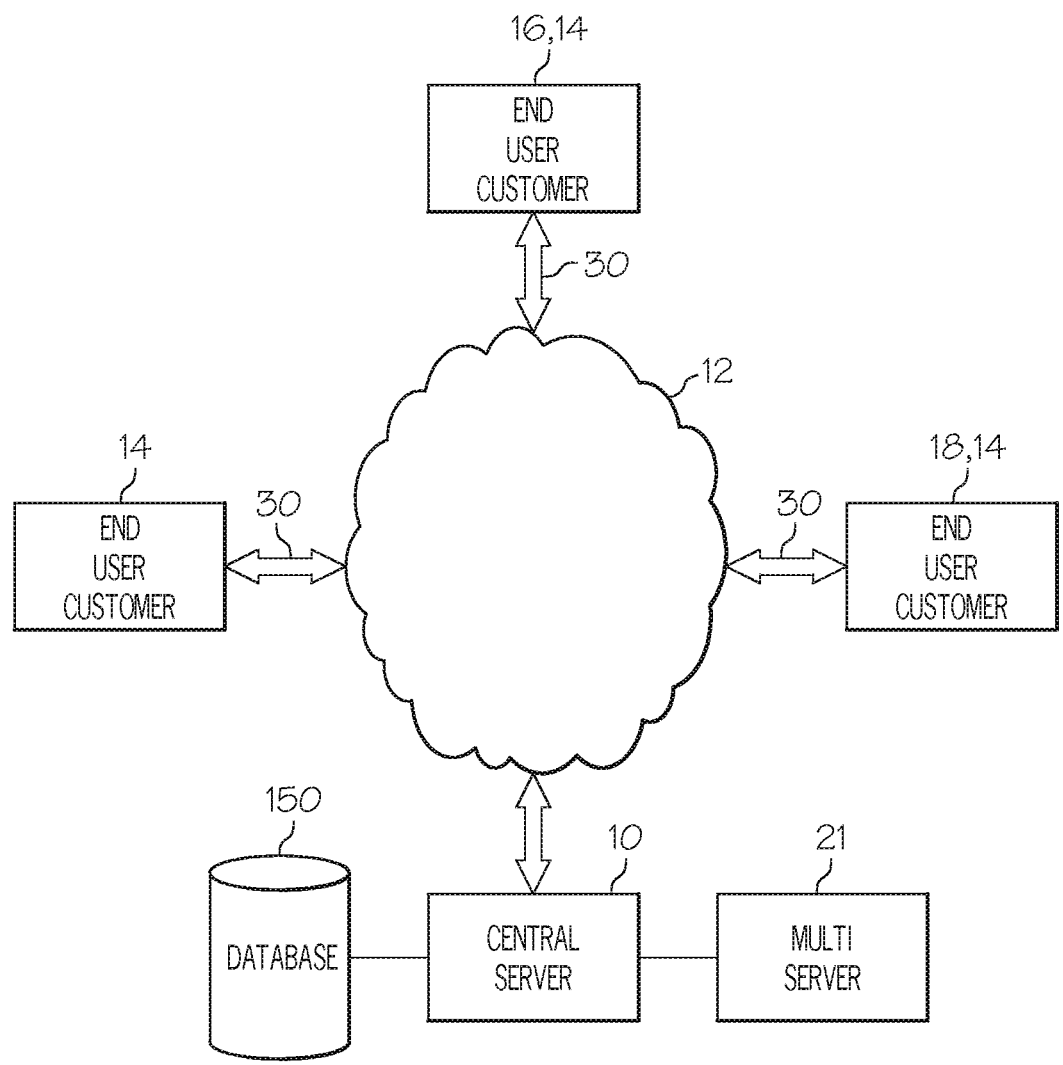
FIG. 1 is an overview block diagram of the system.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained. The present invention is described with reference to the enclosed Figures wherein the same numbers are utilized where applicable. The present invention comprises a system whereby messages to be played on hold recorded can be selected and created online and rapidly downloaded as a playable file and preferably via an MP3 Flash Card. In one embodiment, the system may include a downloading tool to download one or more message as a playable file. In a most preferred embodiment, the invention comprises an interface whereby an end user can sign up for the services and place in or upload a plurality of prospective on-hold messages.

The present invention will now be described in detail with reference to embodiments thereof as illustrated in the accompanying drawings. In the following description, an audio content distribution control system and method will be discussed. Those of skill in the art will appreciate alternative labeling of the audio content distribution control system as a distribution system, message playback system, on-hold message system, the invention, or other similar names. Similarly, those of skill in the art will appreciate alternative labeling of the audio content distribution control method as an on-hold message delivery method, message playback method, method, operation, the invention, or other similar names. Skilled readers should not view the inclusion of any alternative labels as limiting in any way.

Referring to FIG. 1, a most preferred embodiment of the present invention is disclosed and shown. The most preferred embodiment comprises a central computer server 10 connected by a computer network 12 to remote end user stations 14. The central server connects to a database 150. As will be discussed herein, the database 150 will include data related to end users and their respective on-hold messages.

In a preferred embodiment, end user stations 14 comprise a plurality of end users 16, 18. End users 16, 18 are defined herein as entities linked to the system that comprise companies and individuals who desire to upload, author or download on-hold messages. Users 16, 18 are linked with the central computer server 10 via a transport medium 30. End users 16, 18 will typically comprise companies, professionals and individuals that desire to create, access and download on hold messages. In a most preferred embodiment, will be linked via a global computer network 12 such as the Internet or Worldwide web, but other embodiments including LANs, WANs and Intranets, which fulfill the spirit and scope of the present invention.

The end user devices 16, 18 will typically comprise any device that connects to the system via the Internet or other IP transport methods and includes, but is not limited to, such devices as televisions, computers, hand-held devices, cellular phones, land based telephones, wireless electronic devices and any device which uses a transport medium 30. Non-limiting examples of a transport medium 30 applicable for use in the present invention comprise any backbone or link such as an ATM link, FDDI link, satellite link, cable, cellular, twisted pair, fiber optic, broadcast wireless network, the internet, the world wide web, local area network (LAN), wide area network (WAN), or any other kind of intranet environment such a standard Ethernet link. In such alternative cases, the end user will communicate with the system using protocols appropriate to the network to which that client is attached. All such embodiments and equivalents thereof are intended to be within the scope of the present invention.

Referring again to FIG. 1, the present invention may comprise a multi-server 21 environment which comprises a computer system in accordance with the present invention that allows the multiple end users 16, 18 to communicate with the system. Through communication link and transport medium 30, end user customers and end users 16, 18 are linked to the central server 12, preferably by a customizable interface to be described in greater detail below.

Figure 2:
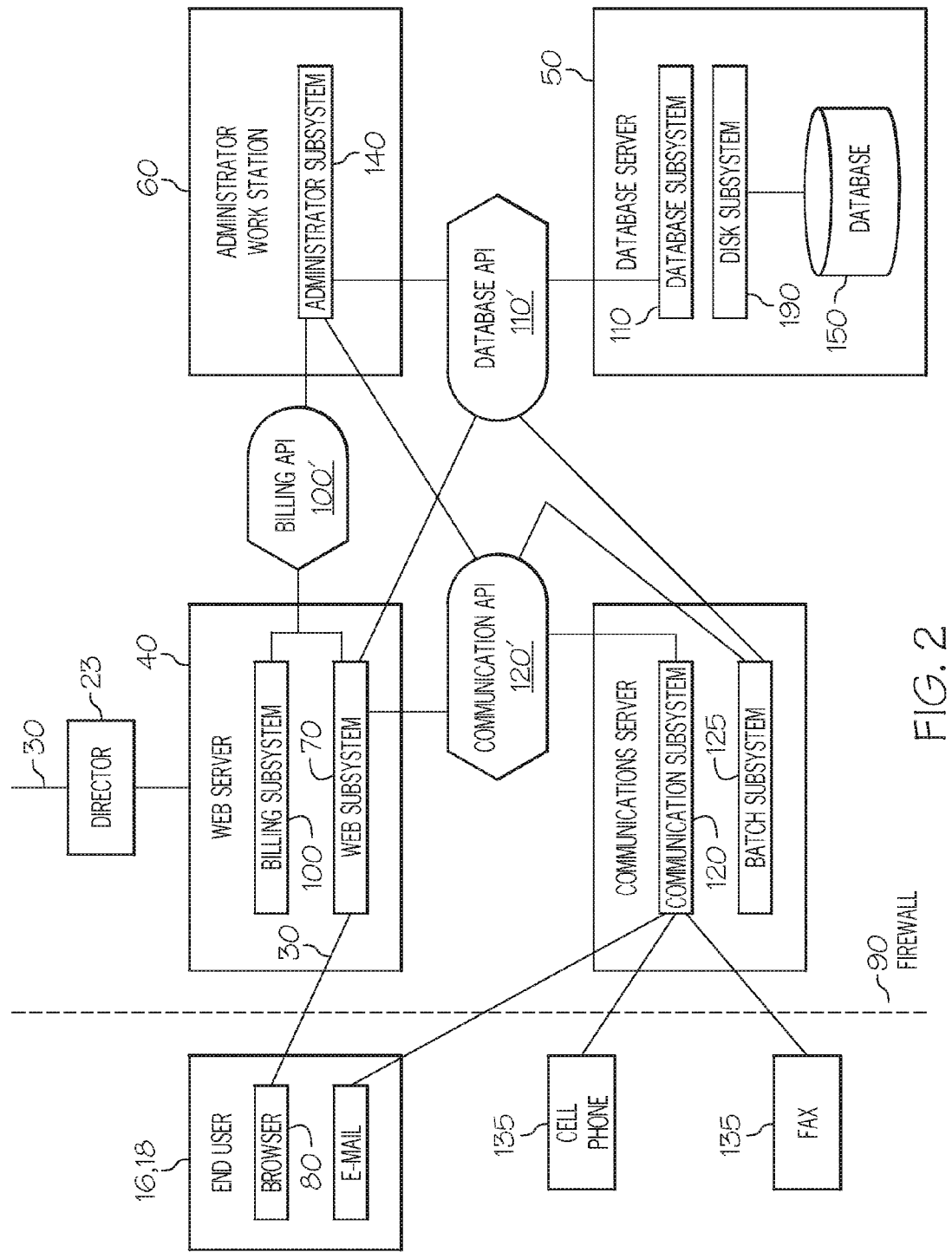
FIG. 2 is a detailed diagram of the system.
Figure 3:
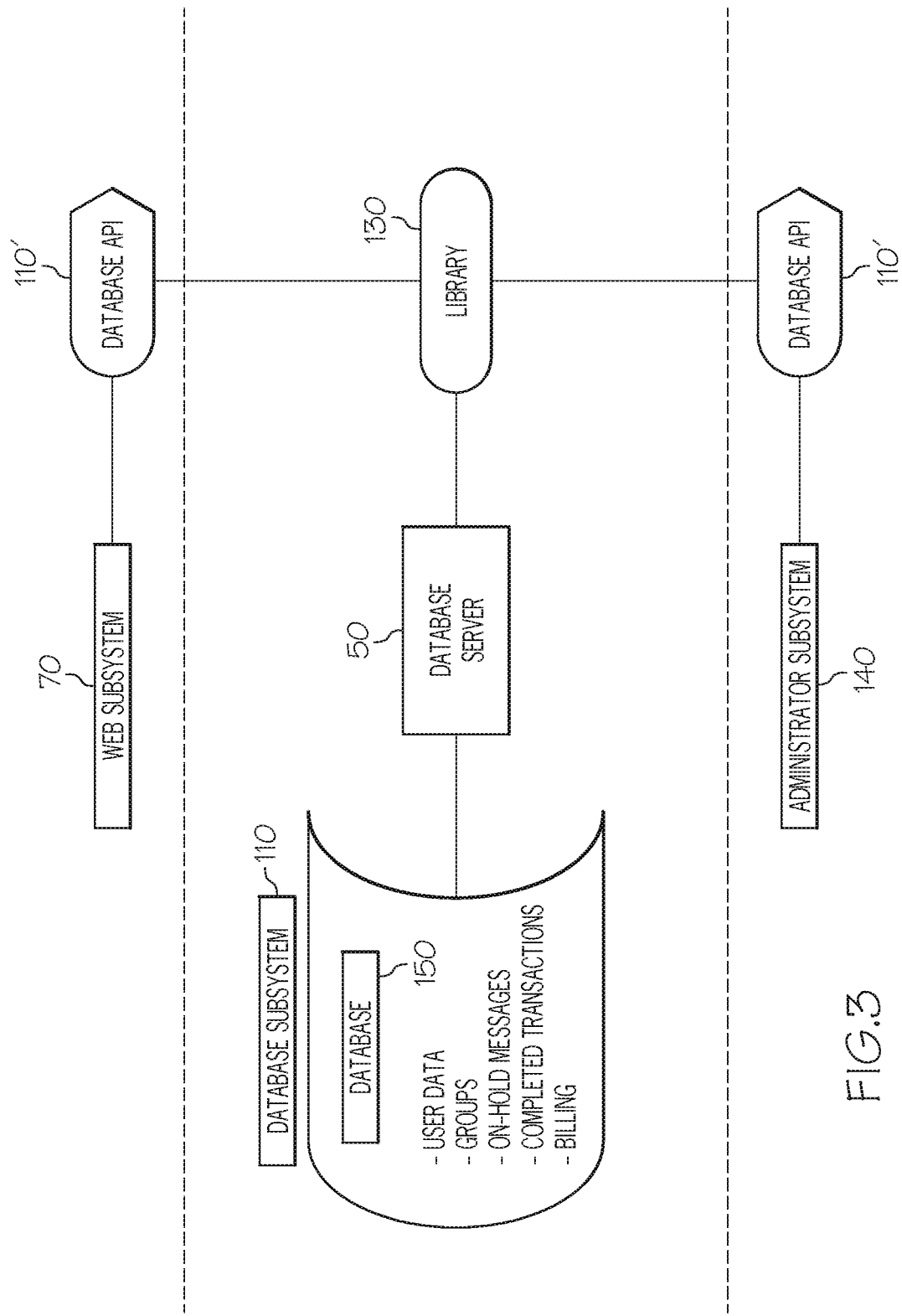
FIG. 3 illustrates the database architecture of the present invention.

Referring to FIGS. 2 and 3, the central server and database systems of the present invention are now shown and described in greater detail. A local director 23 routes signals through the system to the various servers, to be described below, and to and through transport medium 30 to end users 16, 18. The system preferably includes two primary servers, a web server 40 and a database server 50 which may operate using such database platforms as SQL server or Oracle. The system may operate under other platforms such as ASP and JAVA (e.g. J2EE) Hence, in one embodiment the SQL server may run SQL server database management software from Microsoft Corporation.

Alternatively, the server can further comprise an Oracle database server. The system further includes an administrative work station 60 or system which provides the administrative capabilities and monitoring for the system under the control of an administrative subsystem 140. The administrative work station 60 allows administrators or other operators to perform routine operations which affect the entire system. Such operations include, but are not limited to, administering the accounts of end users 16, 18 monitoring the traffic through the system, the tabulating of user balances and ratings, printing reports and maintaining the programs that comprise the overall system as well as uploading new on-hold files.

A web subsystem 70 is responsible for all interactions with a web browser 80 in the end user devices 16, 18 and serves as the end user interface to the system. All interactions between the end user devices 16, 18 and the database subsystem occur through the web subsystem 70. Internet Information Server 200 (IIS) by Microsoft Corporation is an exemplary web server software system 70 in accordance with the present invention, although the present invention is in no way limited to this system. The expression of the user interface presented to end users 16, 18 in their client devices may be implemented as HTML or other high level computer language or technology, and may be displayed in a standard web browser.

All world wide web systems listed above are preferably communicated, for example, by an Ethernet 100 base T network and a switching hub. In addition, a second isolated network segment will preferably exist between the web server 40 and the external communications hardware (e.g. internet router). Such a system will keep external traffic isolated from the internal network, as well as provide a dedicated connection between the web server 40 and the Internet for maximum throughput. The systems will have an initial configuration of random access memory for the web server 40 and preferably at least 128 megabits for the database server 50, both having the capability to expand.

The web server 40 may be a point of entry to the entire system. The system determines the identity of the user 16, 18 and makes appropriate decisions while serving web pages to the end user 16, 18. The web server 40 sends HTML, XML, JAVA, or other high level computer language to the end user work stations 16, 18, validates passwords, sends logging and transaction information to the database server 50, and performs logical operations, thus behaving as a transactional server.

As noted above, in one embodiment, the server operating system may be a Windows NT server, a multi-platform operating system provided by Microsoft Corporation. The Sun Microsystems Solaris is an alternative embodiment. The server typically includes IIS, which is a completely integrated Internet application platform. IIS includes a high-performance web server, an application development environment, integrated full-text searching, multi-media streaming, and site management tools. The security infrastructure is integrated within the server, thus enabling an easy-to-maintain and highly-secure web development and deployment environment. It is to be appreciated that the invention envisions new and expanding technologies.

The operators of the central system may create, delete and update account information by utilizing the administrative subsystem 140 in administration work station 60. A billing subsystem 100 is used for crediting and debiting end user accounts.

Database 110, communication 120 and billing 100 subsystems thus execute essential services for the other parts of the system, and will therefore have well-defined application program interfaces (API) 110', 120', 100', as is well recognized by those with skill in the art. The system will preferably be protected for the Internet by a "firewall" 90 which is a safety precaution, and important with respect to the present invention due to the sensitive and confidential nature of the information in the database. As will be discussed below, firewall 90 plays an important and critical role in the present invention because of the confidentiality of the data associated with some applications of the present invention.

In a preferred embodiment, the database subsystem 110 stores all pertinent information related to user accounts, administrator accounts, payments and messages, as well as general dynamic system information. All interactions with the database subsystem 110 are performed through a database API 110' which may define the interface to a library of stored procedures 130. These are used to implement high-level database functions and to shield the details of the database implementation from the other subsystems. The database subsystem 110 is preferably implemented using database server 50.

The administration subsystem 140 may provide an interface for operators and managers of the system to modify the database, print reports, view system data and log user comments and complaints. The administration subsystem 140 provides a collection of access forms, queries, reports and modules to implement the administration interface. Administrators typically will have the power within the system to force most actions. The administration subsystem 140 will interact with the communications, database and billing subsystems.

The communications subsystem 120 interfaced to a communications API 120' will be used to email and contact end users 16, 18. End users 16, 18 may be notified by phone, fax, email or pager, or other communications devices which can be contacted by the system 135. End users 16, 18 will also have a password accessed section of a website where they can access on-hold messages and obtain detailed reports.

A batch subsystem 125 may periodically send out grouped notifications. It will access the database subsystem 110 to determine what notifications are required, and uses the communication subsystem 120 to make those notifications. A group notification may comprise a special premium offered to end users 16, 18. The billing subsystem 100 will be used to verify and bill credit cards and communicate through the billing API 100' to the administration subsystem 140, and potentially to an outside billing and verification service which could be used to perform the billing functions.

Referring to FIG. 3, the database server 50 which implements the database subsystem 110 of the present invention comprises a server that maintains all associated logging and transaction information for the system. Through the database 150 (which is backed up by a backup database for safety purposes), the database server 50 logs information regarding the end user customers and their respective on-hold messages, maintains user account information, maintains account balances, produces and prints reports, hosts backup operations and performs statistical calculations for the entire system.

Figure 4:
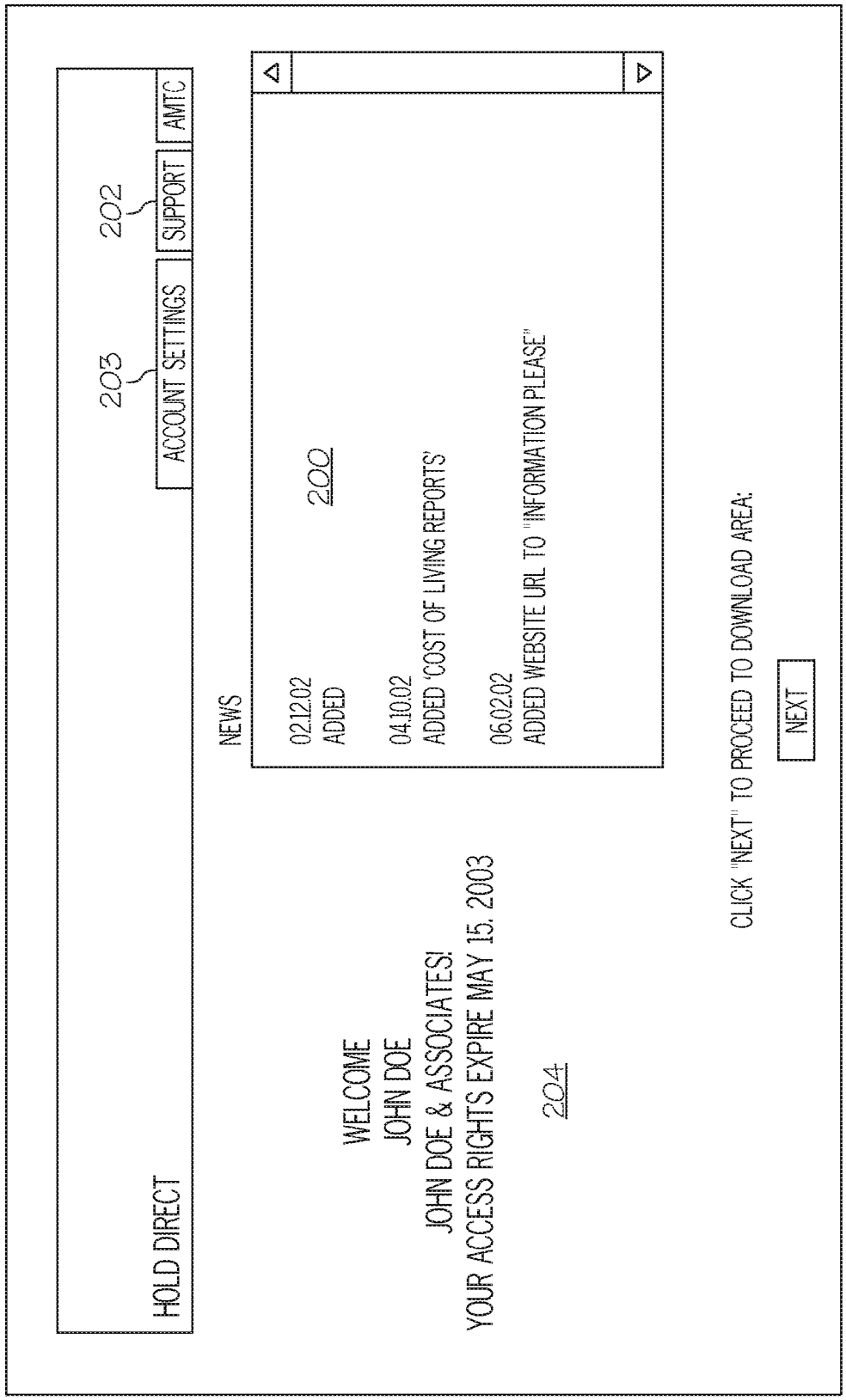

The database server 50 is preferably a multi-core computer microprocessor. Each connection to the database 150 and its associated work may be handled by a separate thread within the database server 50 process space. It is anticipated that a multi-core machine is sufficient for the type and amount of transactions that it will be performing, however if it proves insufficient, the database can be "striped" to two or more machines to distribute the server load. With the above describing the operational background of the invention, referring to FIGS. 4 to 8, the present invention is described in the context of an online system for accessing/authoring and downloading on-hold messages. As shown in FIG. 4, the system comprises an initial homepage.

The homepage may be the homepage of a website such as HoldDirect.com, assignee of the present invention. The homepage will illustrate information such as news 200, and buttons for support 202 and account settings 203. The home page may be personalized for the user 204.

In one embodiment, the system comprises a system whereby end users, customers and companies who desire on-hold messages can easily access those messages from a remote web server. In a most preferred embodiment, the on-hold messages are downloaded onto a compact flash card and then played on a player system associated with the telephone system. The flash card is designed to work with a system that may store and plays stored phone messages in association with the phone system.

Figure 5:
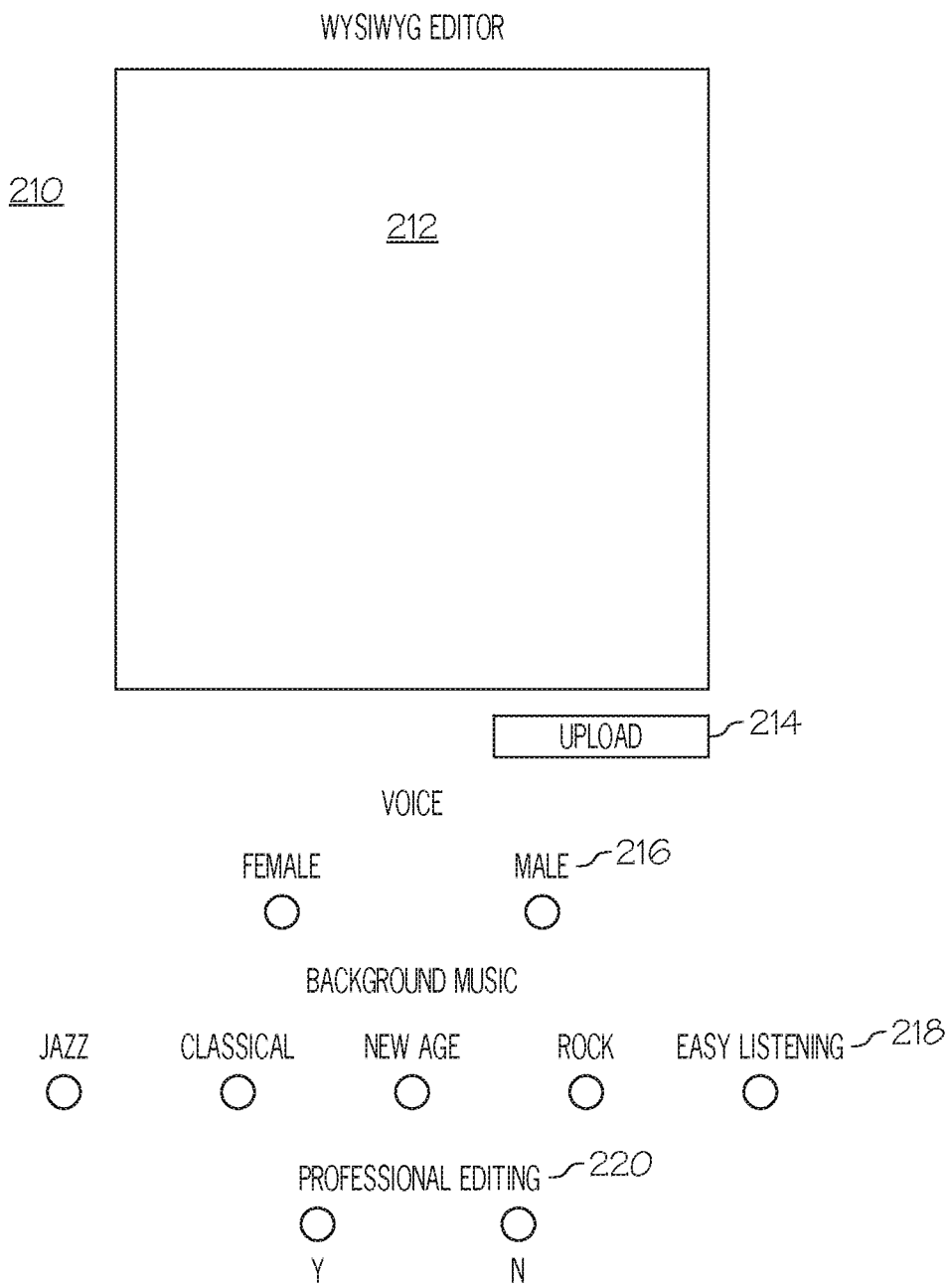

As shown in FIG. 5, the user is presented with a series of user screens in which he or she can complete a number of tasks related to the creation, editing and downloading of on-hold messages. The screen has a location for creating a script 210. The script can be composed online 212 or uploaded as a file 214. The end user can also input requests that the script be recorded by a male or female 216. The end user customer can also select the type of background music 218 which is to be used with the upload or created presentation. Examples of the types of background music include jazz, classical, new age, pop or rock, or easy listening 218. The message may or may not be professionally edited 220 according to the request of the end user. This may also be a billed service and thus tracked by the billing subsystem 110.

Figure 6:

After the message request is authored or uploaded as shown in FIG. 5, the end user will receive a message via email or other notification mechanism (e.g. phone or fax) informing him or her that this message has been created and is ready for review and approval prior to recordation and the addition of music. Referring to FIG. 6, the end user can then go online, enter a secure server, review the message and then approve or edit it using 230, for example, a WYSIWYG editor. After the message is finally approved, it is recorded by the requested male or female voice and the requested background music is added as noted above.

Figure 7:
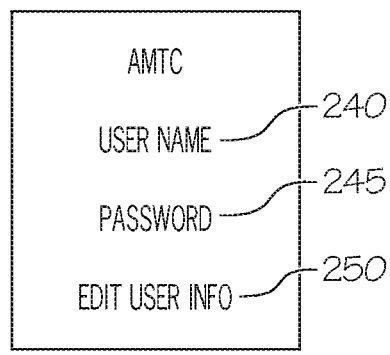

Referring to FIG. 7, it is to be emphasized that in a preferred system, access is password protected. When a customer initially is provided access to the system, he is provided a default login 240 and password 245. The password may be an automatically generated record ID. The system may manually set the access expiration date. The user will typically be notified of the initial login and password so he could gain access. The user could change request to edit information 250 via an accounts settings screen.

If the end user is new to the system, the option may include an online payment option which will then be activated and associated with the billing subsystem 110. A user would sign up for the service and renew via a commonly known payment method such as Visa, MasterCard, Amex, Discover, PayPal, etc.

Each audio file will therefore have a record in the database 150. The record will contain the title of the file and the full text of the narration contained in the file and will identify a "group" to which the record belongs. Groupings may be based upon the types of recordings. For example, Groups may include seasonal messages, directions to the business, or specific product or service offerings.

In operation, the end user customer 16, 18 will login and be presented with the titles of the audio records available to him, as determined by his end user configuration. The end user may select the files the user wishes to download and a local destination drive on his machine. The user can then copy the desired files from the local drive to a compact flash card using, for example, a USB card writer peripheral device. Because the flash card writer will appear as a local drive, the user may be able to download directly to the compact flash card.

More specifically, as shown in FIG. 8, the system for accessing and downloading files is shown in detail in the context of a series of on-hold messages for a fictional "Moving Company." The user highlights one or more files from the left and/or right windows of screen using standard Windows. As files are selected 258, the cumulative total size of all files selected is displayed as shown 260. Users will be able to use compact flash cards of any desired capacity. This permits users to keep track of their running total for the selected files, to make sure they don't select more than their flash card can hold. Custom messages 262 are provided as well.

When a user double-clicks a file, a popup window displays the filename and text for that file. The user may then click the "Next" button so that the "Save to" screen appears to allow the user to designate the local destination drive for the files. To stop users from playing MP3 files downloaded from other sources, and to prevent the sharing of files between owners of our players, the MP3 files will be encrypted so they can only be played on the user's specific player. This encryption will be performed by a separate program. When the user clicks "Download" on the download screen, the system queries a 6-digit player serial number and sends this serial number along with the selected files to the encryption program, which will encrypt the MP3 data with the 6-digit serial number.

Figure 9:
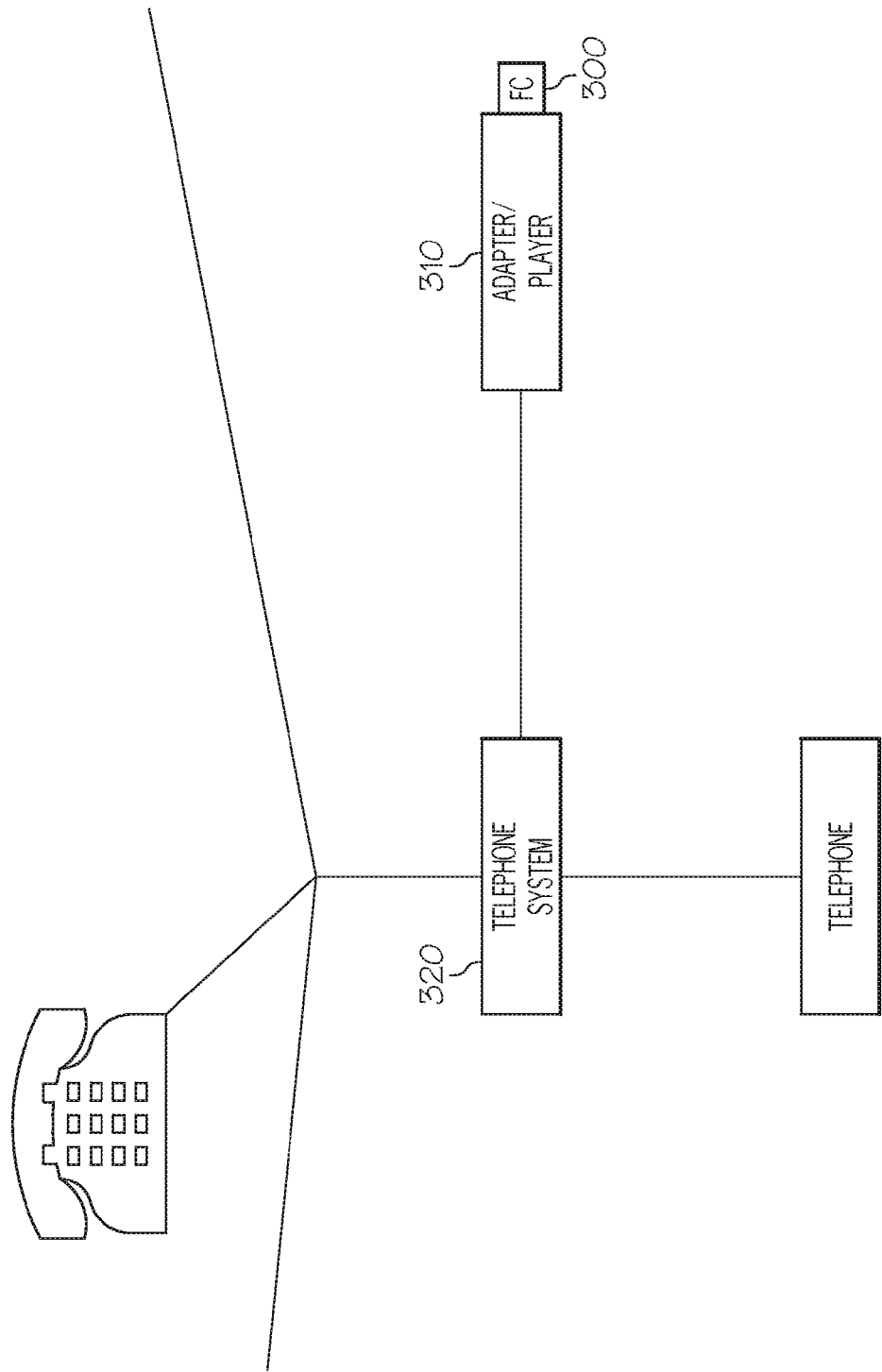
FIG. 9 is a diagram of the present invention used with a telephone system.

The new, encrypted files are "returned" to the downloading application and are sent online to the user and copied on to the compact flash card 308. A typical "downloading progress" gauge may be displayed during encryption/downloading, and a "complete" message displayed at conclusion, with two buttons available for the user to select "Download more files" (which would simply close the download screen, revealing the file download page again) or "logout" as shown in FIG. 9. The card then is inserted into a player/adaptor 310 which is associated with the telephone system 320 and which activates when customers are placed on hold.

Figure 10A:
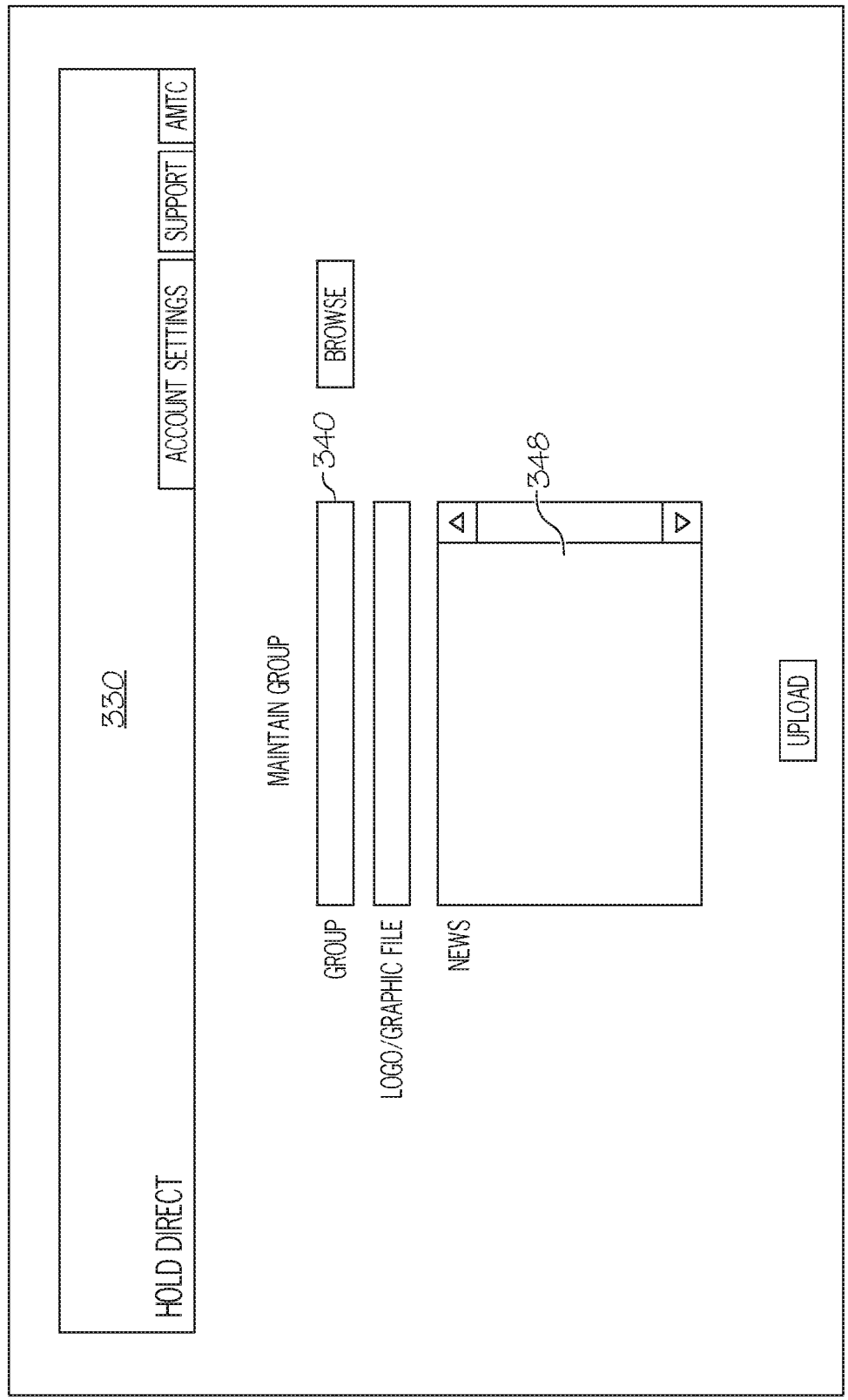
FIGS. 10a and 10b illustrate user screens for use in conjunction with the administration system of the invention.

The administrator station 60 is now more fully described. FIG. 10*a* illustrates a screen for maintaining a group 330. The administrator may be prompted to either enter a group or select it from a drop list 340. If no database record for the group exists, administrator may either enter a path/filename of a logo graphic or select it using a standard browse feature. The administrator station 60 may access an input screen 348 that allows administrator to type your news item, which can be posted on a greeting page at the end of any existing news, stamping the data automatically. After some preset period of time old news could be timed for automatic removal.

Figure 10B:
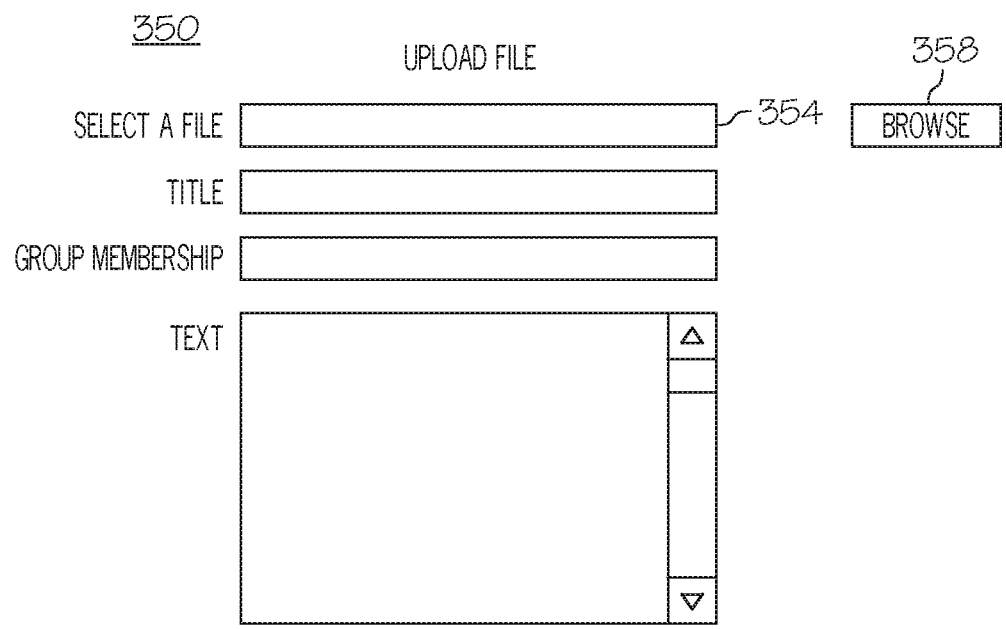

FIG. 10*b* illustrates a file uploading screen 350. The administrator may either enter the path/filename of the audio file to be uploaded 354 or select it using a standard browse feature 358. The administrator may further enter a descriptive title for the file. The administrator selects the group membership for the file from a drop list. The administrator then enters the text of file. The administrator clicks the "Upload" button. A new audio file record will therefore be created in the database.

Audio Content Distribution Control

Figure 11:
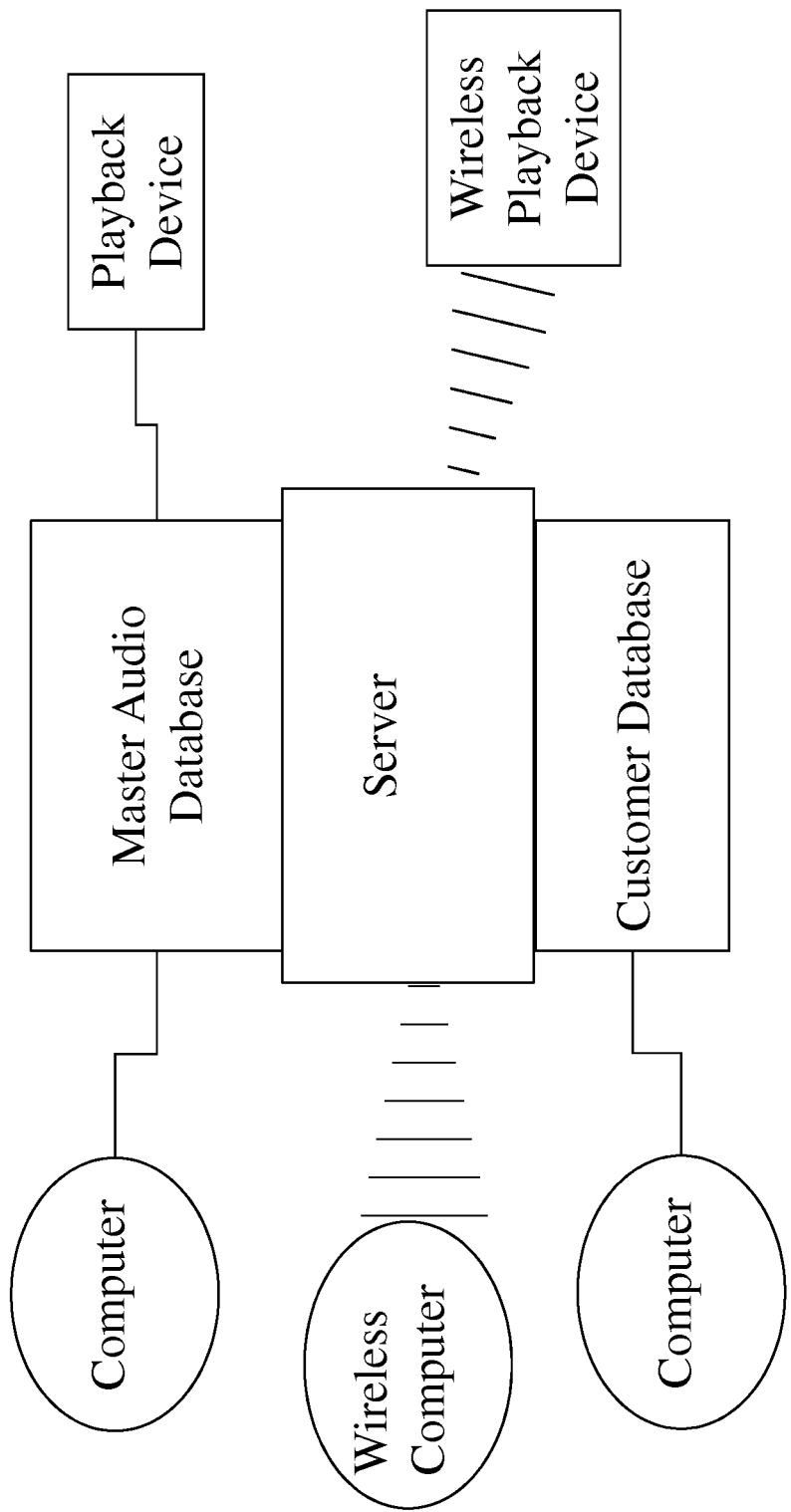
FIG. 11 is a schematic diagram of an audio content distribution control system.

As shown in FIG. 11, the invention also includes an audio content distribution control system that permits more than one user to access and control features of the system which distributes audio files to one or more locations for playing (or playback) on one or more playback devices. The system can be used by a single user or by a plurality of users, for example, large multi-location customers who have multiple users. The audio content distribution control system can include software, a computer, a server, a telecommunications network, and a playback device. The software can feature a user interface and software application features that permit multiple users to access and control the selection and distribution of a plurality of audio files. The computer can include a display device on which the user interface is viewable. The server can feature a master audio content database, wherein the master audio content database includes a plurality of audio files. The software can be installed on the server. The telecommunications network can communicatively connect to the computer and server. The playback device can download and play audio files, and is communicatively connected to the server. These components of the system are described in more detail below.

In one embodiment, the audio content distribution control system can include a shared access control module or feature that permits at least one user to be designated an administrator with administrative privileges that allow absolute control over the system's controllable features. One or more other users can be secondary users who have varying degrees of control over the system's controllable features, wherein the degree of control granted to each secondary user can be set by the administrator using user access control features of the system and its shared access control module. In one example, a manufacturer can use the system to share control of advertising messages and other audio files with the manufacturer's dealers. The manufacturer can assign each dealer a number of messages to control. As administrator, the manufacturer can use the system to monitor its dealers to make certain that the manufacturer's messages are being played by the dealers.

The audio content distribution control system can include software that is installed on a server located either locally or remotely from the location where the users are located. The system may include more than one server on which software and databases of the system are installed. The server can be located remotely from the computer and the playback device. The playback device can be remotely communicatively connected to the server via the telecommunications network. The playback device can feature remotely controllable adjustable control settings that can be controlled by a user via the user interface.

The system can be accessed remotely or locally via a computer that is connected to a telecommunications network. The computer can be, for example, a desktop computer, a laptop computer, a personal digital assistant device, a cellular phone, a smart phone, a digital music and messaging player device having a web browser software and Internet connection, or any other portable, handheld, or stationary electronic computing device. The telecommunications network can be, for example, the Internet, a local area network, a wide area network, a wireless cellular network, or any other suitable wired or wireless telecommunications network to which the computer can connect for the purpose of downloading and uploading (or transferring) data via the telecommunications network to and from the server. In one embodiment, the system can include a user interface that is accessible on a website hosted on the same server or on a different server, which can be accessed and viewed on a display device of the computer. The system and its features can be accessed and controlled by the user using the user interface that is accessible on the website. In another embodiment, the system can include a downloadable software application or installable software application that can be installed on the computer device and which includes a user interface through which the system and its features can be accessed and controlled. The software of the user interface and the system features can be installed on a computing device wherein the computing device is the server or one or more computers of the system.

The server can include one or more databases, such as a master audio content database, installed thereon which store audio files that can be viewed and selected for distribution by the user. The server can include an integrated or separate but connected transmitter, receiver and transmitter, or transceiver to transmit electronically, via a wired or wireless telecommunication system, the selected audio files for playing on the playback device. The audio files can be preset audio files provided and made available by the system manufacturer, audio files uploaded by one or more users, or a combination of both preset and uploaded audio files. The audio files can be sound recordings of music, advertisements, or any other suitable audio content that the user wishes to distribute for playing on the playback device. The playback device can be a digital music and messaging player device, a receiver, a transceiver, an intercom system, a stereo system with speakers, a telephone system, a radio system, a satellite radio system, or any other suitable wired or wireless audio playback device.

In an exemplary embodiment, the playback device features an integrated system for downloading audio files from the server and for playing back the audio files. In other embodiments, the playback device can include a system for downloading audio files from the server and a separate system for playing back the audio files that can interface with and be connected to the system for downloading audio files. The system can further include an audio system featuring speakers for playing aloud the audio files downloaded by the playback device from the server. The playback device can be communicatively connectable to the audio system.

The playback device can include a converter software application that converts the digital audio files downloaded and received from the server into analog audio content that can be played by a conventional audio system having at least one speaker for playing audio content for listening, e.g., a telephone, a telephone system, a stereo system, or an intercom system. The converter software application can be installed on the system for downloading and receiving audio files from the server, or the converter software application can be installed on the separate system for playing back the audio files in embodiments where that separate system for playing back audio files includes a computer processor.

The playback device is communicatively connected to the server so as to download and obtain audio files transmitted from the server to the playback device. The playback device can be programmed to automatically query or poll the remotely located server for any modified adjustable control settings and any new audio content selected by a user using commands submitted by the user through the user interface viewed on the display device of the computer. By polling the server periodically, the playback device pulls new settings and audio content from the server, as selected by the user, and downloads the new settings and audio content to the playback device for implementation of the new settings and playing of the new audio content. The playback device can be communicatively connected to the server by the same telecommunications network that communicatively connected the server and computer or by a different telecommunications network. The playback device can include speakers as integral components or separate freestanding speakers may be connected to the playback device. The playback device can include adjustable control settings that can be modified by the user either using control buttons or touchscreen control features on the playback device or via remote control features accessed remotely using the computer and user interface. Some examples of suitable playback devices that can be used with the system include Horizon, RemoteLink IP, iQueue 2, iQueue 3, iQueue 3.5, and various Sirius Satellite Radio receivers.

The audio content distribution control system can also include a multi-user advertisement upload feature that allows multiple users to log in to the system via a computer with connection to the telecommunications network and place advertisements in sound slots existing in music played at a business or other location. The music can be telephone hold message music or intercom music played over a speaker or other sound playback system installed in a store or other location. Thus, using the system, an administrator such as, for example, a retailer, can permit one or more advertisers to access the system by logging in to alter the advertiser's advertisements without requiring the retailer's involvement.

The audio content distribution control system can also include an audio file selection feature that permits the user to select audio files from a customized mix of files selected by the user or from a preset playlist of audio files. In an exemplary embodiment, the audio files are individual songs or genres of music. The audio selection feature of the audio content distribution control system may also permit the user to determine the percentage of time each genre of music plays at a user location. The user location can be a retail store, business telephone system, or other suitable physical location or communications system.

By accessing the user interface on the website by computer, any user authorized to make changes to a playback device can modify or adjust the playback device's adjustable control settings. Users can have access to one or many playback devices, and one playback device can be accessible to one or many users. Any user that has authority to access a particular playback device can modify any adjustable control settings, which are customer-modifiable settings of the playback device such as, for example, its volume, messaging interval, subscription type, and advertising content. In one embodiment, no hierarchy exists between multiple users as they are related to a playback device. In other embodiments, a hierarchy may exist between multiple users insofar as which users have ultimate and absolute control over a playback device.

The system can require each new customer to register for a new administrator user account, which includes creating a user name and password to access the system via the user interface. Once the new administrator user account is created, a customer database can also be created, which includes a number of unassigned slots into which advertisements or other audio content may be placed for playing on the playback device. The system also permits the administrator to create new user accounts for secondary users who have limited access to select audio content and to modify the playback device's adjustable control settings. A secondary user can upload audio advertisements, informative messages, or other audio content for playing in the slot assigned to that user so that as the playlist of music or other audio content plays in a loop, at regular intervals, the user's assigned slot will be reached in the loop and its selected audio content played on the playback device.

The audio files can stored in any digital electronic audio file format including, for example, MP3, WMA, AAC, Ogg Vorbis, and any other suitable audio file format capable of being played on the playback device.

Any playback device can have any number of administrator users and secondary users; however, in an exemplary embodiment, by default, each playback device will initially have a single user, the administrator. The administrator can thereafter delegate user privileges for the playback device to as many secondary users or additional administrator users as the original administrator desires. The administrator can also select which features of the system each secondary user is permitted to access and control. Individual permissions that can be granted separately include: requesting custom production, altering billing and subscription details, adjusting playback settings such as volume and shuffle mode, changing the background music channel, location setup information, and advertising message selection. In addition, the administrator can delegate control of individual advertising "slots" on the administrator's playlist for a playback device or group of playback devices to specific secondary users, thereby allowing the secondary users to change only their allocated portion (i.e., slot or slots) of the playlist.

The system can also include a cloning tool that permits a user to copy all of the modified settings and audio content selection of one playback device for use with one or more different playback devices.

In one embodiment, the audio content distribution control system of the present invention may include an interface and a downloading tool, which have been discussed above in greater detail. The interface may allow an end user to access the message from a database connected via a network. The interface may include a cloning tool and a message locking tool. The cloning tool may be used to substantially duplicate settings by reading the settings from a source device and writing the settings to a target device. The message locking tool may be used to define the message required to be included in a playlist. The downloading tool may be used for downloading the message as a file to be played on a phone system of the end user.

The cloning tool will now be discussed in greater detail. The cloning tool may be used to clone settings between phone systems and/or playback devices. Device cloning may allow a customer to manage a large number of devices to do so "en masse", without the need to manage each individual device. Using the cloning tool, device management configuration settings, such as selection of messages and music channels, interval of music between messages, etc., may be quickly and easily shared between devices. To clone the settings, a user may designate a source device as desired, select "Cloning" on a menu of the interface, select a target device, and initiate copying of the settings.

The system may be configured to display only target devices of the same type as the source device. Target devices to which settings can be cloned may be included in a list of target devices. An "All" selector may be provided to easily select all of the available target devices. Alternatively, devices may be individually selected devices by clicking a box or selector next to each device. As another option, the "All" selector and or individual selectors may be deselect from the cloning operation.

The list of target devices may be sorted, for example, by clicking a title or heading in any column that include sortable details. For example, to clone settings relating to a special message playlist for all devices located in stores in California, a user may simply click the title of a "State" column. All devices in California will be grouped together, making it easy to select them as target devices. As will be discussed in more detail below, a target device may include a locked message in the playlist for that device, even if it was not included in the playlist of the source device.

The message locking tool will now be discussed in greater detail. The message locking tool may be used to designate one or more messages to be required for inclusion in a playlist distributable to phone systems and/or playback devices. The message locking tool may allow a message to be forced into the message playlists of all devices to which that message relates. Message locking may be applied to one or more playlists that are sortable or capable of being categorized according to special program-specific, company-specific and device-specific parameters. An administrator may designate one or more messages to be locked into one or more playlists using the interface.

A special program may include a targeted marketing group. For example, an administrator may manage promotional campaigns for a manufacturer. The administrator may desire for a message relating to the specific promotional program to be distributed to all its dealers. The dealers may operate the system as a secondary user. The secondary users may then customize their playlists as desired, albeit with a requirement to include the messages locked by the administrator for inclusion. A message that is locked by an administrator may appear to the secondary user, so that he or she is aware of its presence, but may be made inaccessible for manipulation, for example, "greyed out" and/or displayed with an icon indicating its status. Additionally, a text string may be displayed to a user upon attempted selection and/or hovering over a locked message indicating that the message is locked and required to be included in the playlist.

A company-specific message may be locked by an administrator for all playlists operated under the company's name. For example, a company may wish to allow store managers to manage the devices at each store, tailoring each playlist to the store's product mix, customer demographics, and other marketing related considerations. However, the company might want to ensure that certain messages be included in all playlists. An administrator at the company level may indicate one or more messages to be locked into the playlists presented by all its stores, while still allowing the store managers to otherwise customize the playlist as a secondary user.

A device-specific message may be locked by an administrator to be included in playlists operated by one or more device. Device-specific messages may include directions to a location, hours of operation, and other operational messages. Messages may be locked for certain devices to allow device-specific messages to remain when other settings are configured using the cloning tool discussed above. Normally, using the cloning tool would cause the target players to receive a message playlist identical to the source player, thus preventing inclusion of unique device-specific messages in the playlists of the target devices. By using the message locking tool to configure a device-specific message, such messages would continue to be included in a playlist after the other settings have been cloned or copied from a source device.

A playlist may be locked or unlocked by using the interface, contacting a customer representative, or otherwise interacting with the system. Messages may be locked and unlocked at will. Locking messages may be most effective when using a phone system and/or playback device connected to a network and capable of receiving updates over the network. However, skilled artisans will appreciate that use of the system and/or the message locking tool is not intended to be limited to use with network connected phone systems and/or playback devices. New playlists for the network connected phone system may be compiled periodically, for example, hourly, and may be received by the player once or more times daily without any involvement by device users. Changes to message lock statuses become effective, and thus required for inclusion or exclusion from playlists, relatively immediately upon being received by the player. As an example of using the system with a playback device that is not configured for automatic updates, the messages on the player may be changed when the user elects to download and load them into the player.

In operation, a method of using an audio content distribution control system to configure an on-hold message will now be discussed. Skilled artisans will appreciate the following example methods are provided in the interest of clarity to describe illustrative operations that can be performed using the system of the present invention. Discussion of these examples is not intended to limit the present invention in any way.

An illustrative method aspect will now be described for accessing and configuring an on-hold message. An interface may be accessed to define the message selected from a database connected via a network to be heard by an end user. The message locking tool may then be operated to define the message required to be included in a playlist. An administrator may be provided access to lock the message in the playlist. Conversely, a secondary user may have access restricted from manipulating the message that is locked in the playlist. The secondary user may otherwise customize the playlist. The cloning tool may be operated to substantially duplicate settings. The message locking tool and/or cloning tool may be accessible via the interface. Additionally, the message may be downloaded as a file to be played by a phone system. A conflict between the message locking tool and the cloning tool may be resolved in favor of the message locking tool.

Figure 12:
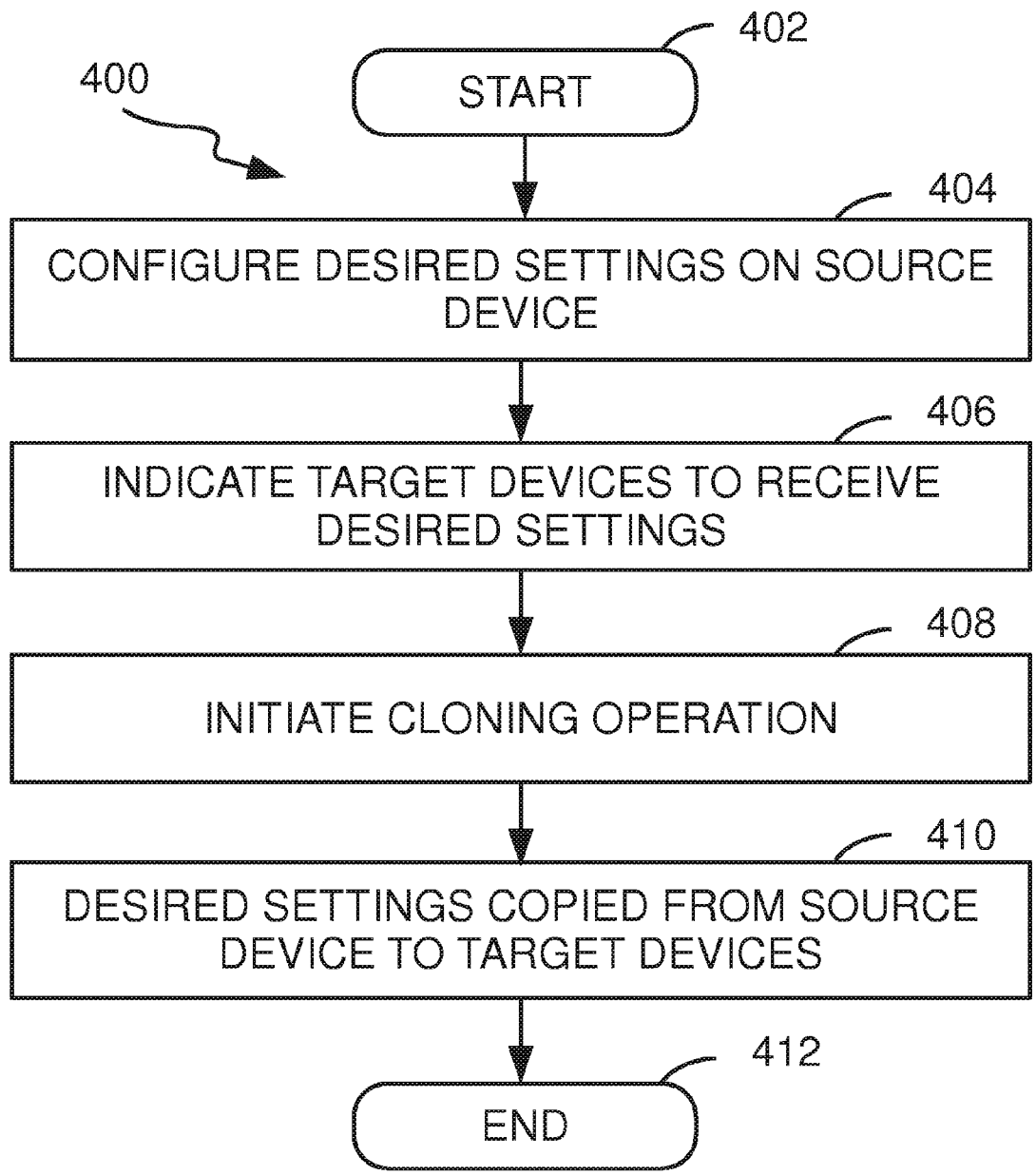
FIG. 12 is a flowchart of an illustrative use of the cloning system, according to an embodiment of the present invention.

Referring now to flowchart 400 of FIG. 12, an illustrative operation of using the cloning tool will be discussed. Starting at Block 402, a user may configure desired settings on a source device. (Block 404). The user may then indicate target devices to receive the desired settings. (Block 406). As discussed, the list of target devices may be filtered and/or sorted to facilitate selection of desired target devices. The user may then initiate the cloning operation. (Block 408). During the cloning operation, the desired settings may be copied from the source device to the indicated target devices. (Block 410). The operation may then terminate at Block 412. As discussed above, locked messages may not be able to be overwritten during the cloning operation.

Figure 13:
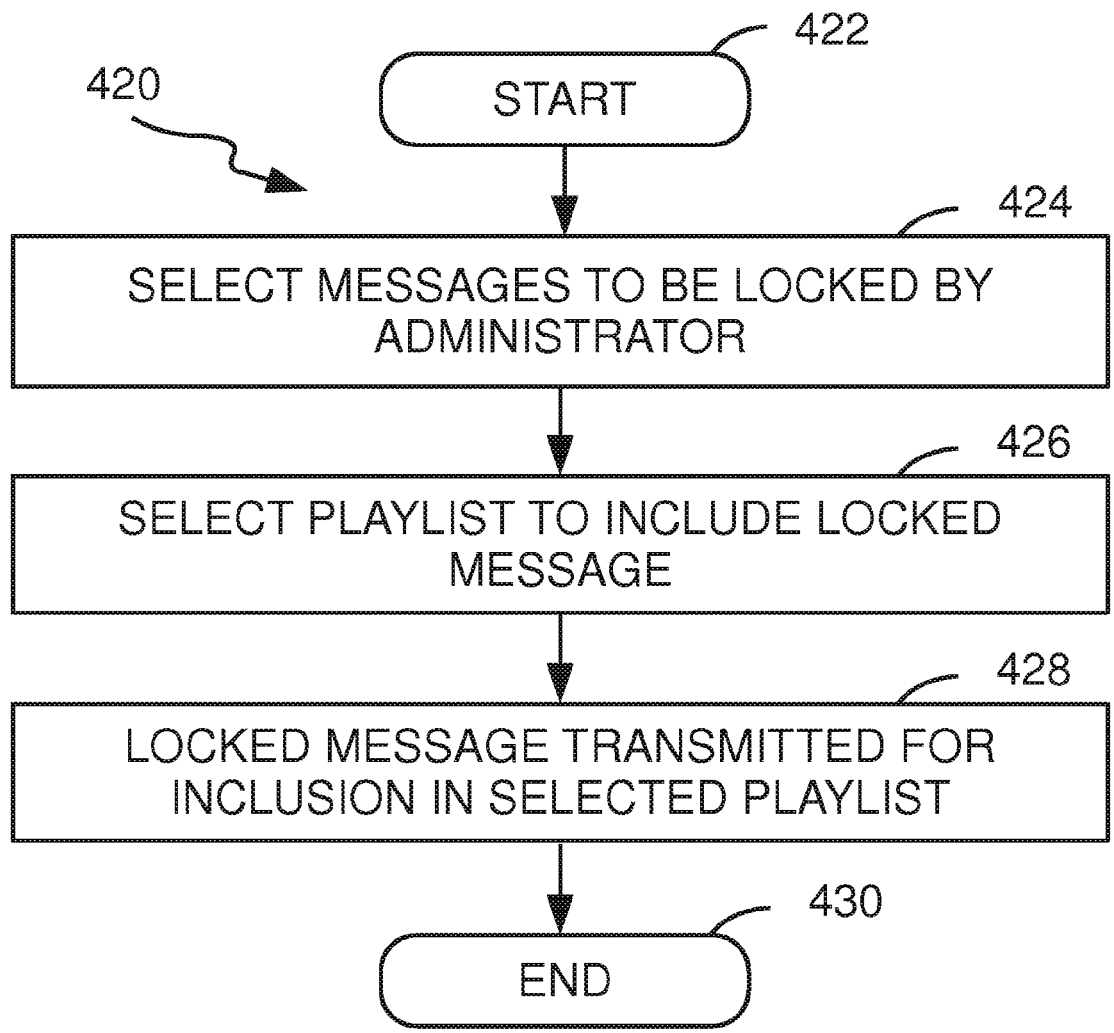
FIG. 13 is a flowchart of an illustrative use of the message locking system, according to an embodiment of the present invention.

Referring now to flowchart 420 of FIG. 13, an illustrative operation of using the message locking tool will be discussed. Starting at Block 422, a user may select a message to be locked. (Block 424). The user selecting the message may be an administrator. The user may then select one or more playlist in which to include the locked message. (Block 426). The locked message may be transmitted for inclusion in the selected playlists. (Block 428). The operation may then terminate at Block 430.

Figure 14:
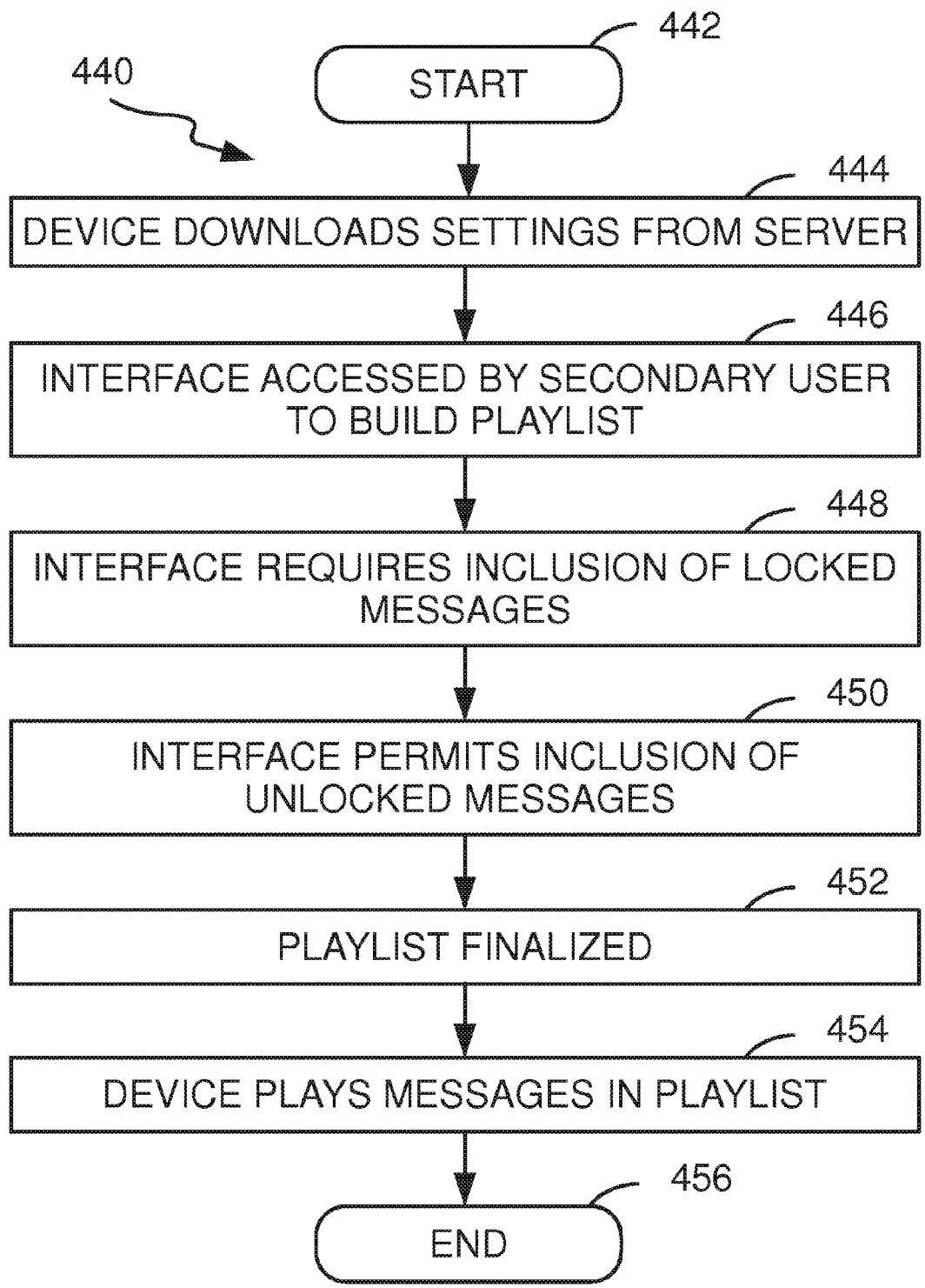
FIG. 14 is a flowchart of an illustrative operation to build a playlist, according to an embodiment of the present invention.

Referring now to flowchart 440 of FIG. 14, an illustrative operation of playlist building will now be discussed. Starting at Block 442, a device may download settings from a server. (Block 444). The interface may be accessed by a secondary user to build a playlist. (Block 446). The interface may indicate required inclusion of locked messages to the playlist, which may be been selected by an administrator. (Block 448). The interface may also permit inclusion of unlocked messages, which may be selectable by the secondary user. (Block 450). The playlist may then be finalized. (Block 452). Once finalized, the phone system and/or playback device may play the messages in the playlist, for example, as on-hold messages. (Block 454). The operation may then terminate at Block 456.

The audio files can include music, audio books, advertisements, telephone messages, on-hold telephone messages, informational audio content, news audio content, or any other suitable audio content capable of playing on the playback device.

In one embodiment, the audio content distribution control system can store and distribute multimedia files for playing on the playback device, which multimedia files can include both audio and video content.

EXAMPLE

A franchisor of a grocery store chain is an administrator. The franchisor provides a playback deice to its franchisee at the franchisee's location. As the original purchaser, the franchisor is the administrator for the new playback device, which includes a unique serial number. The franchisor desires to use a portion of the messaging rotation to discuss the grocery store chain's promotions. The franchisor selects a playlist length for music that is to be played via an intercom system in franchisees' stores. The franchisor further selects the playlist length to provide four assignable slots for playing of four advertisements. The franchisor does not assign slots 1, 2, 3, or 4 to any secondary user. Because slots 1, 2, 3, and 4 have not been assigned to a secondary user, their content is editable only by the administrator, in this example the franchisor. Because the franchisor in this example is the only administrator, or master user, the franchisor is the only user who can edit the messages assigned to these unassigned slots.

The franchisee desires to promote its special of the week. The franchisor uses the website and interface accessed via a computer to create a new secondary user account for the franchisee. The franchisor provides the franchisee access to modify or adjust some or all of the playback device's adjustable control settings, e.g., the volume setting. The franchisor also allots unassigned message slot 2 to the franchisee so as to permit the franchisee to select and assign a franchisee-selected advertisement or other audio message into slot 2. The franchisee is not granted access or permission to alter the audio content of slots 1, 3, or 4. Because the franchisor is the administrator in this example, the franchisor retains system permission to override the franchisee's audio content selection.

Thereafter, the franchisor enters into a nationwide advertising contract with a beverage manufacturer to promote the beverage manufacturer's products in all of the franchisor's grocery stores. The franchisor creates a new secondary user account for the beverage manufacturer. The franchisor does not grant the beverage manufacturer access to change the playback device's adjustable control settings but does assign unassigned slot 4 to the beverage manufacturer. Now, only the beverage manufacturer (or the franchisor as administrator) may alter the audio content selection of slot 4. The franchisee does not have system access to change slot 4's audio content, nor does the beverage manufacturer have access to change slot 2's audio content, which was selected by the franchisee. The beverage manufacturer also does not have administrative access privileges to change the content of unassigned slots 1 and 3. The playback device now has four messages in its looping playlist. The franchisor selects the interval at which the playlist loops to repeat itself and the audio content selections placed in the slots. As secondary users, at any time, the franchisee and the beverage manufacturer may log in to their respective secondary user accounts and make desired modifications to their audio content selections in their respective assigned slots, but may not change any other settings related to the playback device.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for online access to an on-hold message, comprising:
    an interface by which an end user can access a message from a database connected via a network, the interface comprising:
        a cloning tool to substantially duplicate settings by reading the settings from a source device and writing the settings to a target device, and
        a message locking tool to define the message required to be included in a playlist of the target device; and
    a downloading tool for downloading the message as a file to be played on a playback device;
    wherein the message locking tool is usable, when desired, to change a configuration of the message from an unlocked state to a locked state so that the message is required to be included in the playlist of the target device rather than being removed from the playlist of the target device after use of the cloning tool to read and write the settings of the source device to the target device.

2. The system of claim 1, wherein the message locking tool is manipulable by an administrator to lock the message in the playlist, and wherein the message locking tool is restricted from being manipulated by a secondary user.

3. The system of claim 2, wherein the message to be locked is selectable by the administrator as required for inclusion in the playlist that is otherwise customizable by the secondary user.

4. The system of claim 1, wherein the playlist is associable with a device, a company, or the device and the company.

5. The system of claim 1, further comprising:
   software comprising the interface and software application features that permit multiple users to access and control selection and distribution of the file;
   a computer comprising a display device on which the interface is viewable; and
   a server comprising the database, wherein the database comprises the file, wherein the software is installable on the server, and wherein the server and the computer are communicatively connectable via the network;
   wherein the playback device is communicatively connected to the server.

6. The system of claim 1, wherein a conflict between the message locking tool and the cloning tool is resolved in favor of the message locking tool.

7. The system of claim 6, wherein the target device is includable in a list of target devices that is sortable.

8. A system for online access to an on-hold message, comprising:
   an interface by which an end user can access a message from a database connected via a network, the interface comprising:
      a cloning tool to substantially duplicate settings, and
      a message locking tool to define the message required to be included in a playlist, the message locking tool being manipulable by an administrator to lock the message in the playlist and being restricted from being manipulated by a secondary user; and
   a downloading tool for downloading the message as a file to be played on a playback device;
   wherein the message to be locked is selectable by the administrator to be required for inclusion in the playlist that is otherwise customizable by the secondary user;
   wherein the message locking tool is usable, when desired, to change a configuration of the message from an unlocked state to a locked state so that the message is required to be included in the playlist rather than being removed from the playlist after use of the cloning tool to duplicate settings.

9. The system of claim 8, wherein the playlist is associable with a device, a company, or the device and the company.

10. The system of claim 8, further comprising:
    software comprising the interface and software application features that permit multiple users to access and control selection and distribution of the file;
    a computer comprising a display device on which the interface is viewable; and
    a server comprising the database, wherein the database comprises the file, wherein the software is installable on the server, and wherein the server and the computer are communicatively connectable via the network;
    wherein the playback device is communicatively connected to the server.

11. The system of claim 8, wherein to substantially duplicate the settings, the cloning tool reads the settings from a source device and writes the settings to a target device includable in a list of target devices.

12. The system of claim 11, wherein the list of target devices is sortable.

13. The system of claim 8, wherein a conflict between the message locking tool and the cloning tool is resolved in favor of the message locking tool.

14. A method of accessing and configuring an on-hold message, comprising:
    (a) accessing an interface to define the message selected from a database connected via a network to be heard while on-hold;
    (b) operating a message locking tool accessible via the interface to define the message required to be included in a playlist by changing a configuration of the message from an unlocked state to a locked state;
    (c) operating a cloning tool accessible via the interface to substantially duplicate settings; and
    (d) downloading the message as a file to be played by a playback device to the end user;
    wherein a conflict between the message locking tool and the cloning tool is resolved in favor of the message locking tool when the message is configured in the locked state.

15. The method of claim 14, wherein step (b) further comprises:
    (i) providing access for an administrator to lock the message in the playlist; and
    (ii) restricting the access for a secondary user from manipulating the message that is locked in the playlist.

16. The method of claim 15, wherein step (b) further comprises before operation (ii):
    (iii) selecting the message to be locked by the administrator to be required for inclusion in the playlist that is otherwise customizable by the secondary user.

17. The method of claim 15, further comprising before step (a):
    (e) providing the database to include a master audio content database comprising the file that is selectable for inclusion in the playlist;
    (f) registering an administrator account to be controlled by the administrator;
    (g) authorizing the administrator to define the message to be locked;
    (h) registering a secondary user account to be accessed and modified by the secondary user; and
    (i) authorizing the secondary user to customize the playlist without affecting a status of the message that is locked.

18. The method of claim 14, further comprising:
    (j) associating the playlist with a device, a company, or the device and the company.

19. The method of claim 14, wherein step (c) further comprises:
    (i) reading the settings of a source device using the cloning tool; and
    (ii) writing the settings to a target device using the cloning tool;
    wherein the target device is includable in a list of target devices.

20. The method of claim 19, wherein the list of target devices is sortable.

* * * * *